March 29, 1960     H. A. TOULMIN, JR     2,930,315
ROCKET PRESS
Filed Oct. 19, 1953     7 Sheets-Sheet 4
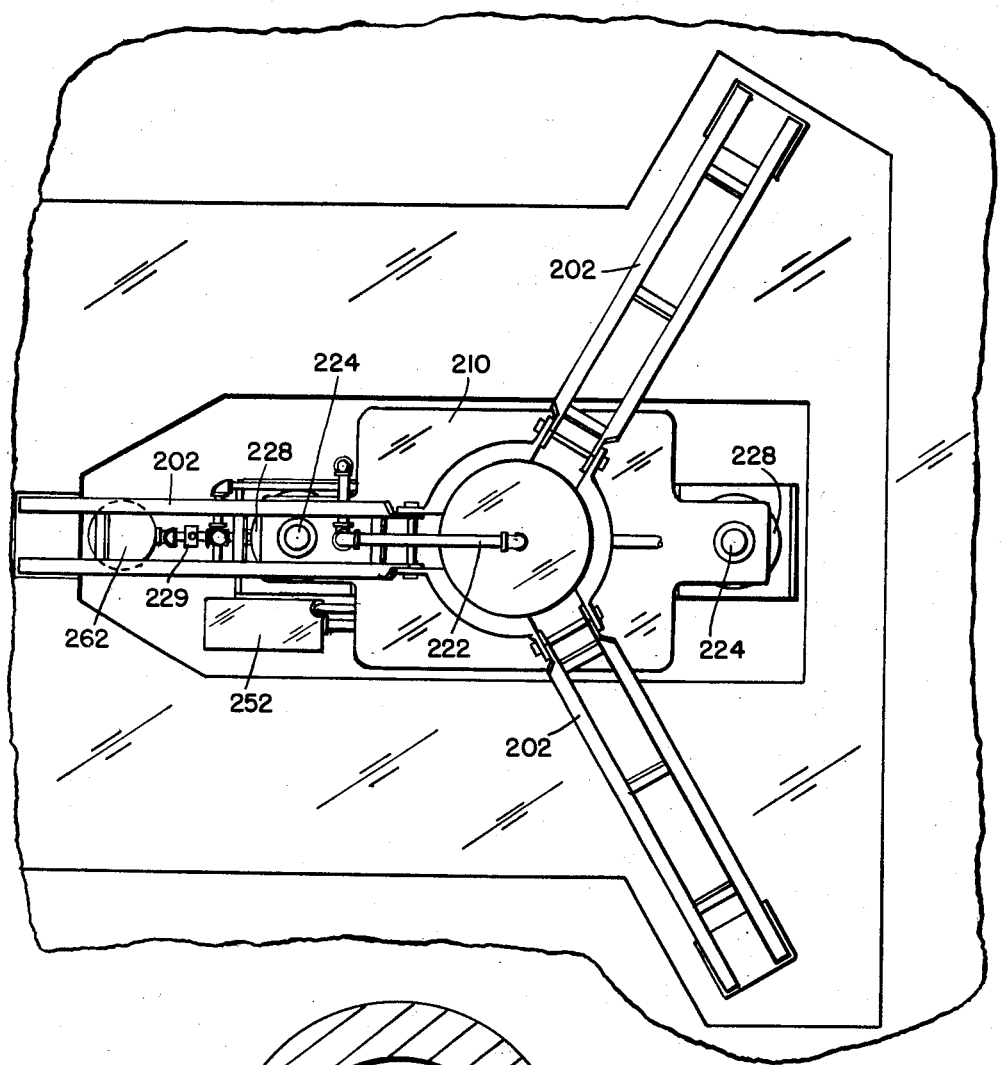
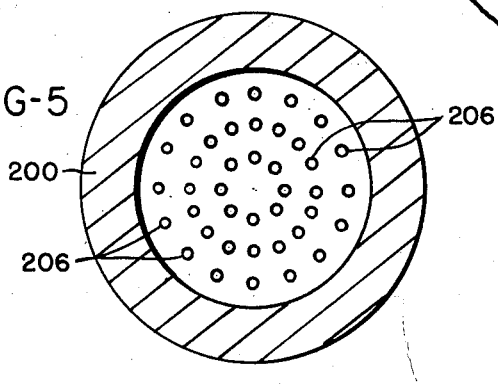
*INVENTOR.*
HARRY A. TOULMIN JR.
BY Toulmin & Toulmin
ATTORNEYS March 29, 1960 H. A. TOULMIN, JR 2,930,315
ROCKET PRESS Filed Oct. 19, 1953 7 Sheets-Sheet 5

INVENTOR.
HARRY A. TOULMIN JR.
BY Toulmin & Toulmin
ATTORNEYS

March 29, 1960   H. A. TOULMIN, JR   2,930,315
ROCKET PRESS
Filed Oct. 19, 1953   7 Sheets-Sheet 6
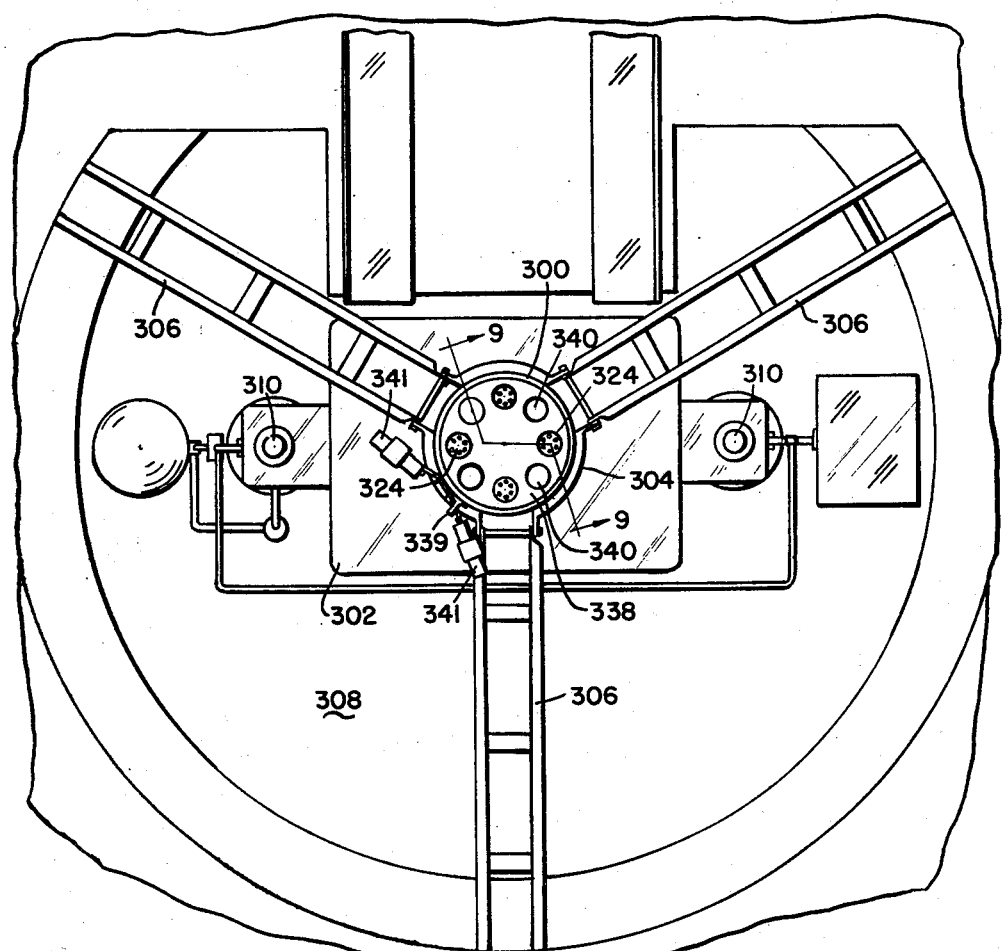
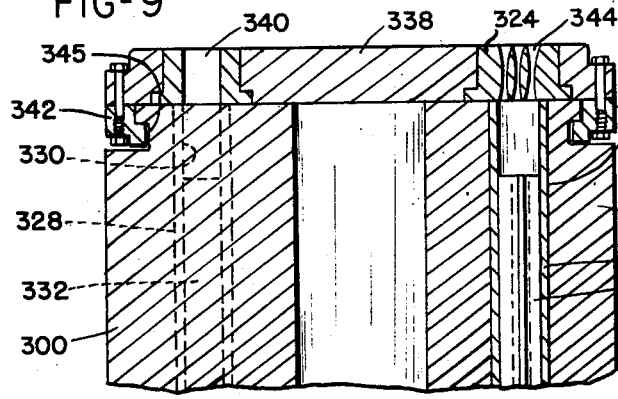
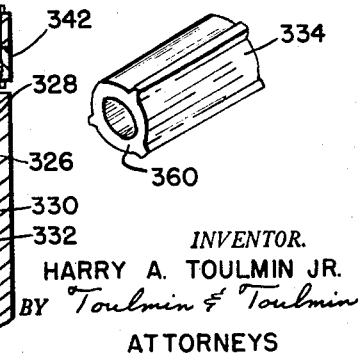
INVENTOR.
HARRY A. TOULMIN JR.
BY Toulmin & Toulmin
ATTORNEYS March 29, 1960 H. A. TOULMIN, JR 2,930,315
ROCKET PRESS
Filed Oct. 19, 1953 7 Sheets-Sheet 7

INVENTOR.
HARRY A. TOULMIN JR.
BY Toulmin & Toulmin
ATTORNEYS

United States Patent Office 2,930,315
Patented Mar. 29, 1960

2,930,315

ROCKET PRESS

Harry A. Toulmin, Jr., Dayton, Ohio, assignor to The Commonwealth Engineering Company of Ohio, Dayton, Ohio, a corporation of Ohio Application October 19, 1953, Serial No. 386,974

9 Claims. (Cl. 100—264)

This invention relates to improvements in power presses and more particularly to a press operated by a form of rocket or jet propulsion.

There has been a growing tendency to make use of large pressings in place of multi-part and complicated riveted, bolted or welded assemblies. This is especially noticeable in the aircraft industry where not only the size but also the speed of airplanes has increased. Supersonic speeds require one-piece structures to eliminate critical surface irregularities such as rivets and the like.

In order to obtain the high pressure and working areas necessary to handle larger one-piece forgings, it has been necessary continually to increase the size of the presses until today these giant structures are extremely expensive and dimensionally large. For example, in a heavy hydraulic press the weight represented by such appendages as tie rods, columns, etc., is a necessary disadvantage in present day presses, considering the immense weight concentrated in the entablature which must be supported.

The present invention contemplates the production of a force from the reaction obtained by combustion or a controlled explosion, rather than by hydraulic means. This force or thrust when properly directed can be made to move a press platen downwardly. The thrust realized by this method is exceedingly high, and yet the weight of structure necessary is far less than that required in conventional hydraulically operated presses.

It is, therefore, a primary object of this invention to reduce the weight and size of a heavy capacity press, such as a forging press.

It is another object of this invention to create the forces exterted by the press by combustion or controlled explosion.

It is a more specific object of this invention to operate a heavy press by jet propulsion.

It is a still more specific object of this invention to depress the platen of a heavy forging press by rocket propulsion.

It is another object of this invention to operate both single and double action presses by rocket propulsion.

It is another object of this invention to provide a cushioning and retracting means synchronized with the motion of the press platen.

These and other objects will become more apparent on reference to the following description and accompanying drawings, wherein:

Figure 4 is a top plan view of the embodiment of the form of the invention illustrated in Figure 3;

Figure 5 is a sectional view taken along lines 5—5 of Figure 3;

Figure 8 is a top plan view of the embodiment of the invention shown in Figure 7;

Figure 9 is a sectional view taken along line 9—9 of Figure 8;

Figure 10 is a detail view of a rocket propellant charge;

Figure 1:
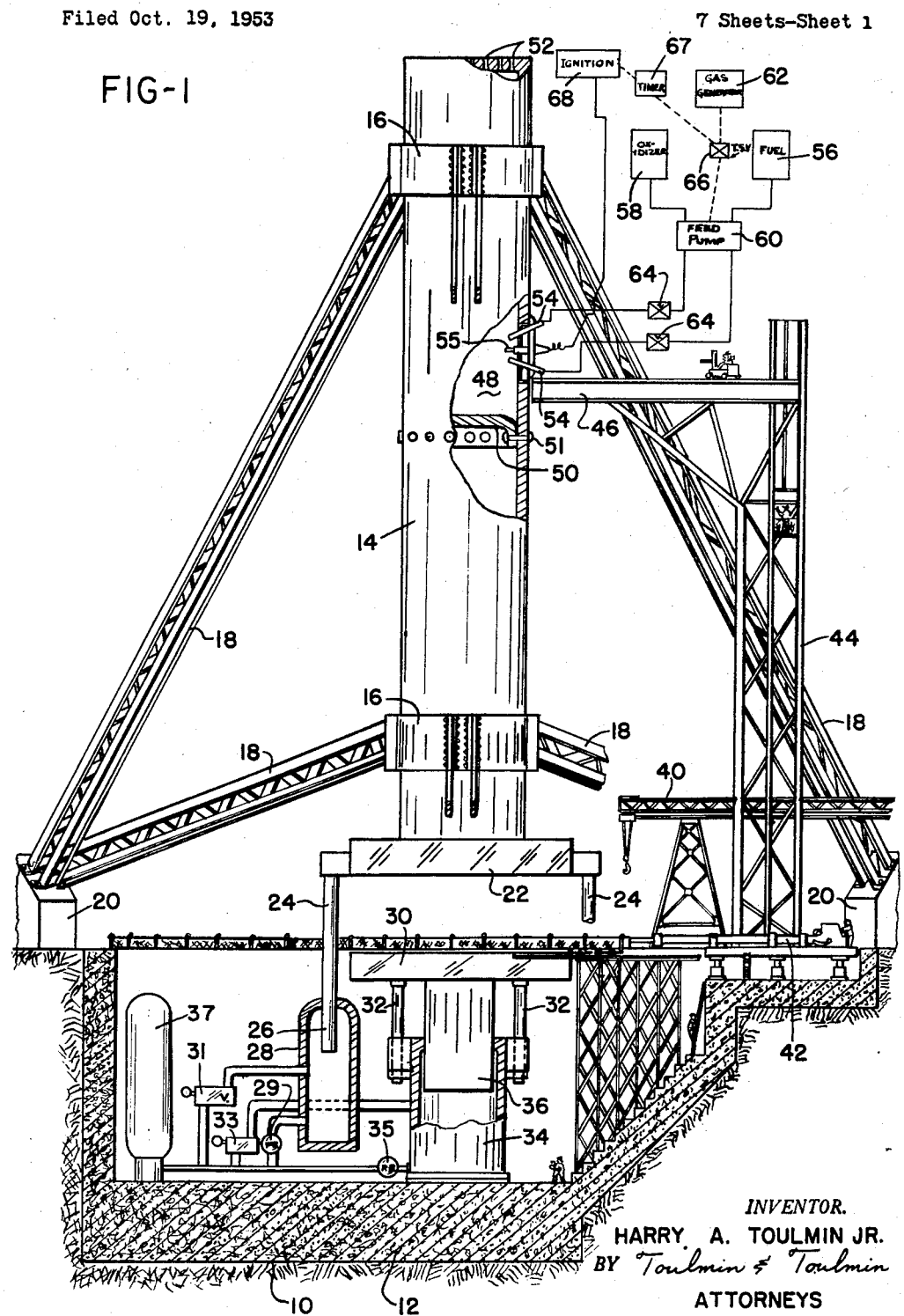
Figure 1 is a side elevational view showing a press embodying the principles of this invention and also showing the mounting foundation.

Referring now to Figure 1, numeral 10 indicates a pit wherein a concrete foundation 12 has been laid. An elongated pressure tube 14 extends upwardly above this foundation and is vertically slidably supported in guiding bands 16 by means of the truss members 18 secured to the concrete foundation blocks 20. Tube 14 is preferably made of an aluminum alloy, low carbon steel, stainless steel, commercial pure copper, alloy steel, or the like, these materials exhibiting the most favorable characteristics needed in the present invention.

Secured at the base of the tube 14 is a platen 22 of usual construction. Arranged at diametrically opposite points on the platen are piston rods 24 and associated pistons 26. Pistons 26 reciprocate in cylinders 28, and in so doing, act to cushion the shock of the platen, as well as to retract the platen after each downward stroke. Bed 30 is supported below platen 22 by a piston 36 secured to the underside of the bed 30 and adapted to move in cylinder 34, as will be evident. Rods 32 limit the upward movement of bed 30 during a retracting stroke.

The hydraulic or oil cushioning and retracting system is provided with an accumulator 37 which is connected by conduits to the cylinders 28 and 34 through relief valves 29 and 35 which provide for cushioning of the bed and platen and also provide a supply of fluid under pressure to accumulator 37. Valves 31 and 33 connected between the accumulator and the cylinders are operable, manually or automatically, to supply fluid from the accumulator to the cylinders to retract the bed and platen after a working stroke.

A crane 40 and a manipulator 42 for handling of large workpieces are provided for positioning and holding such workpieces prior to and during the pressing operation. An elevator 44 extends upwardly to a fuel loading platform 46, and it is from here that the strokes of the platen are controlled.

The interior of tube 14 has a combustion chamber 48 having a lower wall 50 rigidly secured to tube 14, as by rivets 51, and one or more exhaust jets 52 at the upper end. At one side of chamber 48 are a pair of injector nozzles, at 54, designed such that the stream of fuel and oxidizer intersect each other as they enter the chamber. Immediately adjacent these injectors is a spark plug 55 for igniting the charge in the chamber.

A liquid propellant system is contemplated by the present invention, although it will be understood that solid propellants could be used as well.

As illustrated in Figure 1, however, tanks 56 and 58 carry a fuel and an oxidizer, respectively, and such are fed to the proper injector nozzle by means of a turbine feed pump 60 driven by a gas generator 62. Valves at 64 are used to control the proportion of fuel to oxidizing agent and may be electrically controlled if desired. The turbine starting valve 66 is shown to be synchronized with the ignition system 68 so that an ignitable mixture will be formed prior to sparking of plug 55.

The operation of the embodiment is as follows:

The die and workpiece are adjusted either by crane 40 or manipulator 42 to their proper locations on the bed 30 in the usual manner, with valves 31 and 33 closed. With valve 64 adjusted to give the proper mixture ratio, the turbine is started by opening valve 66, which also acts to energize timer 67. This causes streams of fuel and oxidizer to spray into the combustion chamber 48. When a predetermined ignitable mixture is realized, the timer 67 operates to cause a spark at plug 55, initiating combustion. The action of the burning gases in pushing upwardly from exhaust jet 52 creates a forceful reaction on the lower chamber wall 50. Since wall 50 is secured to tube 14 and the tube is slidable in guides 16, the tube will thrust platen 22 downwardly against bed 30, thereby compressing the workpiece therebetween. Simultaneously with the downward thrust of platen 22, the pistons 26 and 36 will compress the fluid in cylinders 28 and 34, and the fluid will pass through relief valves 29 and 35 to accumulator 37. Since the fluid in the accumulator is under pressure, opening of valves 31 and 33 will serve to move platen 22 and bed 30 back to their starting positions, whereupon valves 31 and 33 can be closed preparatory to the next pressing cycle.

Figure 2:
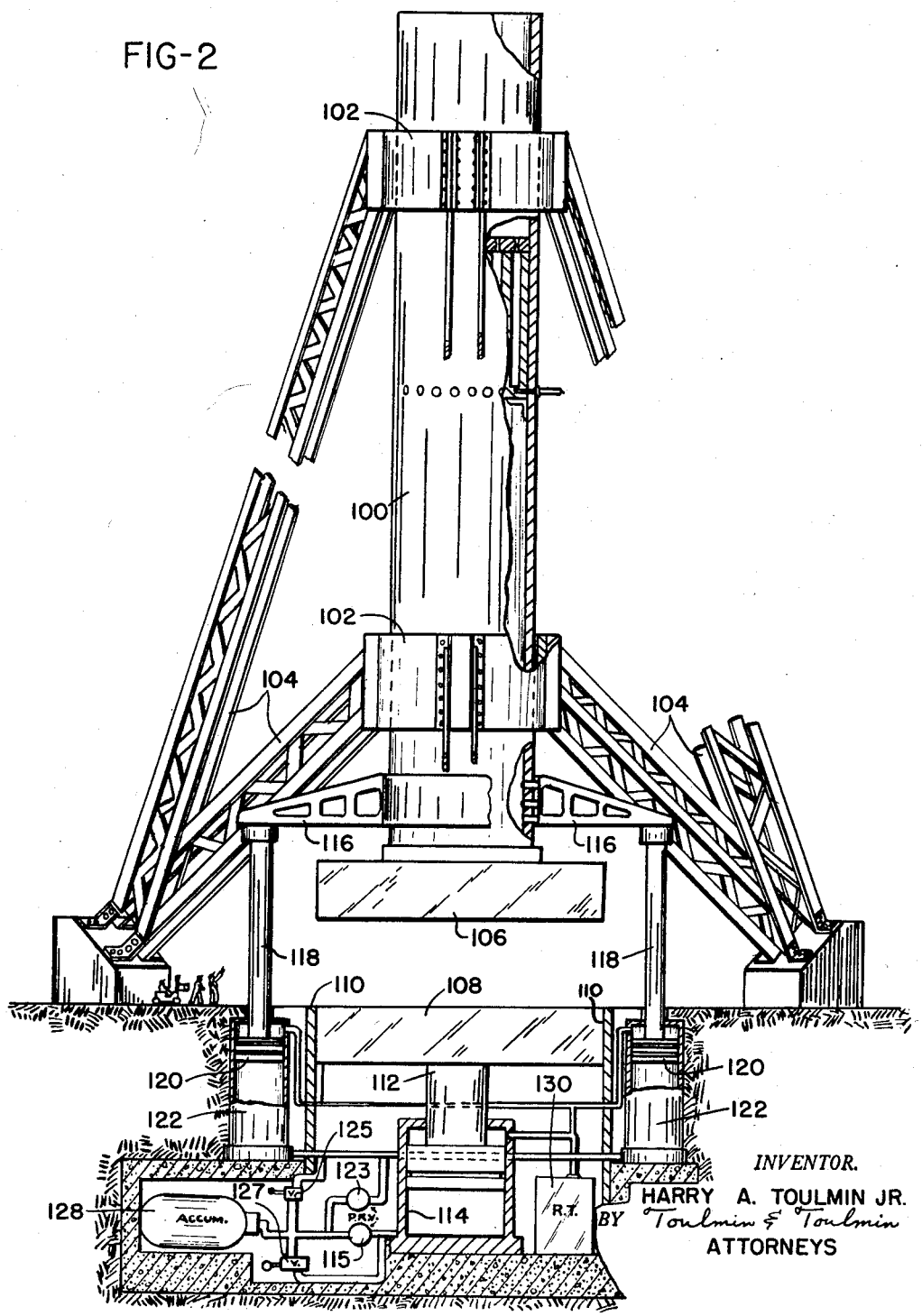
Figure 2 is a view similar to Figure 1, but showing a modified construction.

Figure 2 illustrates a variation in the structure of Figure 1. As in Figure 1, a tube 100 is slidably supported in guides 102 which, in turn, are held in position by truss members 104. Platen 106 is rigidly secured to the lower end of the tube, and directly therebeneath is the press bed 108, slidably mounted in a vertical guide 110. A piston 112 movable in cylinder 114 is secured to the underside of bed 108.

A pair of arms 116 extend from either side of tube 100 and support at their outer ends depending piston rods 118. Piston heads 120 are mounted for vertical sliding movement in cylinders 122 for a purpose to be described. When platen 106 moves downwardly under the force of the expanding gases, the fluid in cylinders 122 is compressed and discharges through a relief valve 123 into accumulator 128. Also, the fluid in cylinder 114 is placed under compression by movement of piston 112 and is discharged through relief valve 115 into accumulator 128. The force of the platen 106 against bed 108 is thus balanced out by the upward force of the fluid in cylinder 114, thereby acting as a cushioning means. When pistons 120 and 112 move downwardly, fluid from reserve tank 130 is drawn in over their respective piston heads. Upon relief of pressure from the platen 106, valves 125 and 127 can be availed of to release fluid under pressure from accumulator 128 to cylinder 114 and 122 thus retracting bed 108 and platen 106 to their starting position. As will be understood, the propulsive means for depressing tube 100 and platen 106 can be identical to that of Figure 1 and thus further explanation is believed unnecessary.

Figure 3:
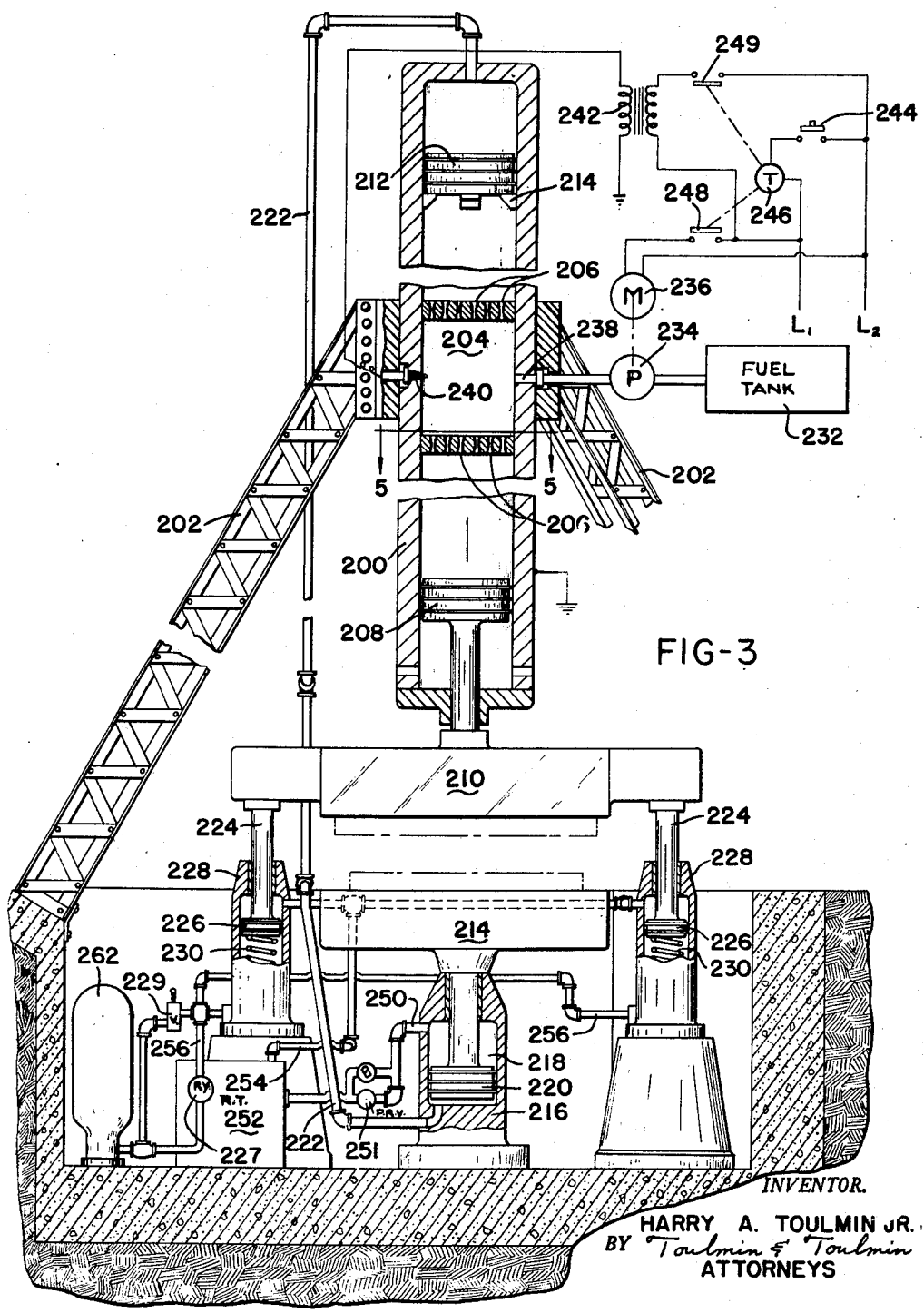
Figure 3 is an elevational view showing a double acting press operating according to the principles of this invention.

Figure 3 illustrates a third modification of this invention and generally relates to a double acting press, that is, both platen and bed have a thrust applied to them. A tube 200 is centrally supported by truss members 202. However, in this embodiment, there is no sliding action of the tube as it is rigidly connected to the truss members. Each end of tube 200 is closed, and disposed intermediate of said ends is a combustion chamber 204. A plurality of exhaust jets at 206 is provided at either end of the chamber, as can be seen more clearly in Figure 5. Disposed in tube 200 below the lower set of exhaust jets 206 is a slidable piston head 208 connected to the platen 210. Above the upper set of exhaust jets 206 is another piston head 212 which is supported on an annular stop ring 214 and is slidable thereabove in tube 200. The space between piston head 212 and the upper wall of tube 200 is filled with some fluid such as oil or water for a purpose to be described.

The press bed 214, is located in the usual manner beneath platen 210 and is supported for sliding movement in standard 216. A cylindrical chamber 218 is provided in standard 216 for slidably receiving piston head 220 which is connected to the bed 214. Chamber 218 is adapted to retain a fluid, such as oil or water, and conduit 222 is provided to connect chamber 218 with the upper end of tube 200 as shown.

The outer ends of platen 210 support depending piston rods 224 which carry piston heads 226 slidable in cylinders 228 at their lower ends. Spring members 230 yieldingly urge the piston heads 226 upwardly in their cylinders and thus act as a retracting means.

The fuel system and ignition system for the modification shown in Figure 3 are somewhat similar to that of Figures 1 and 2, but there are various changes which will now be described. The liquid propellant for this embodiment is considered to include both an oxidizer and a fuel as before, but, as shown in the drawing, it is represented only as a fuel tank 232. Pump means 234 which is operated by motor 236 acts to feed the fuel and oxidizer through conduit means to their respective injector nozzles, represented in the drawing at 238. A spark plug 240 is shown extending into chamber 204 and is electrically energized through the secondary of transformer 242.

A special circuit for synchronizing the action of pump 234 with the firing of spark plug 240 is shown in Figure 3. This circuit receives its power from the lines L1 and L2, and power is turned on by the closing of switch 244. This will connect timer 246 across the line. Energization of timer 246 will cause closing of switch 248, and energization of motor 236 which starts pump 234 which forces both fuel and oxidizer into the combustion chamber 204. After a predetermined time interval, depending upon the time necessary to obtain an ignitable mixture of the fuel and oxidizer in the chamber, timer 246 will close switch 249, thereby placing the primary of 242 across the line, which, as will be evident, causes the spark plug 240 to fire. Combustion of the fuels causes hot gases to be ejected at high velocity through upper and lower sets of nozzles 206. This action places both pistons 208 and 212 under a high pressure, whereupon piston 208 will operate to thrust the platen head 210 downwardly. Likewise piston head 212 will be forced upwardly placing the fluid thereabove under compression. This fluid pressure will be transmitted through conduit 222 to the standard chamber 218, whereupon piston 220 will be forced upwardly, thereby urging the press bed 214 toward the descending platen 210. Thus, this press is double acting in that a direct force or pressure is applied to both the platen and the bed to stamp or press the workpiece therebetween.

The operation of the cushioning and retracting means in this embodiment is as follows:

When the platen 210 is forced downwardly, the piston heads 226 are depressed in their respective cylinders 228 against the action of springs 230. At this same time piston head 220 is moving upwardly in its cylinder 218, and such action causes the fluid therein to be forced upwardly through conduit 250 through pressure relief valve 251 into reserve tank 252. Because piston heads 226 are moving downwardly, the fluid in reserve tank 252 will be drawn through conduit 254 into cylinders 228 above their respective piston heads 226. Furthermore, conduit 256 carries fluid from beneath piston heads 226 through relief valve 227 into the accumulator 262. Collection of fluid in the accumulator causes the gas therein to be compressed, as will be evident. When the pressure is relieved from the platen 210, valve 229 can be operated to supply pressure fluid from the accumulator 262 to cylinders 228 to assist springs 230 in raising platen 210 back to its starting position.

Figure 6:
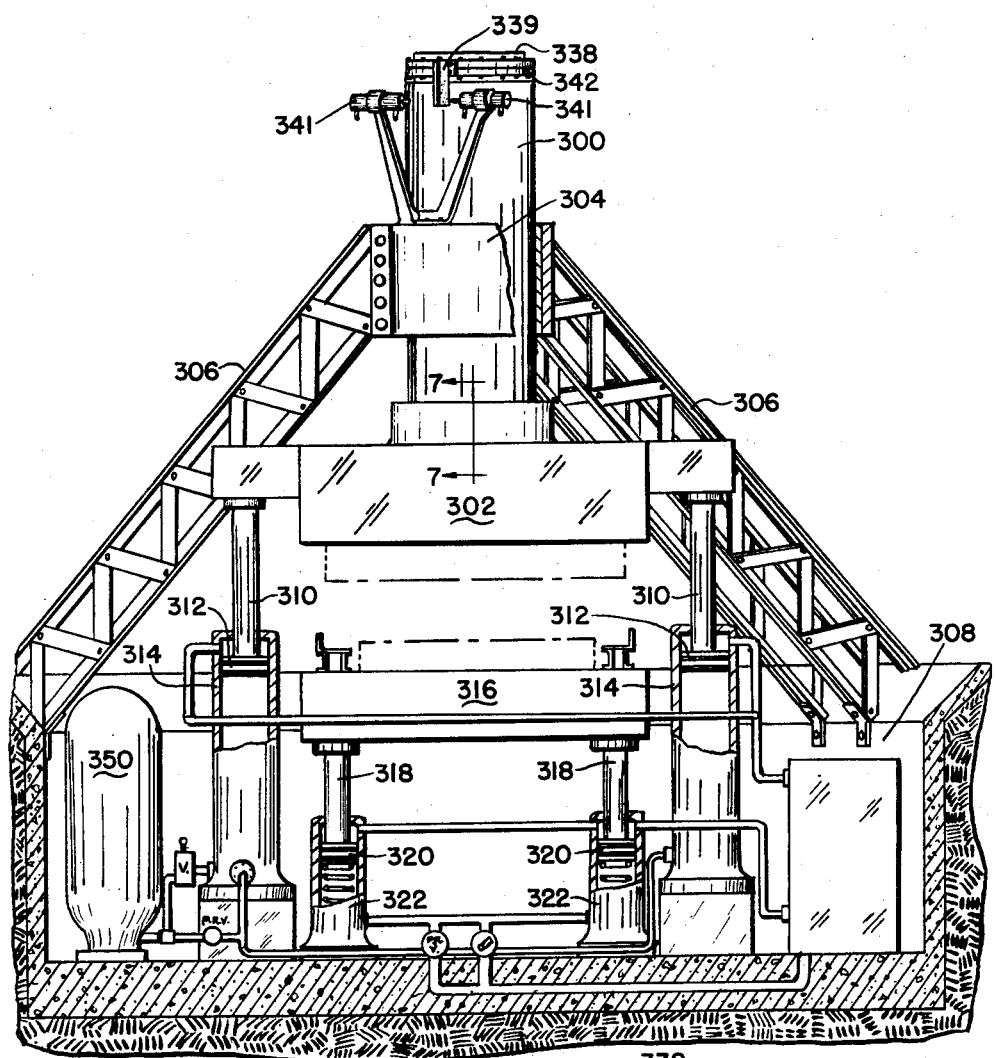
Figure 6 is an elevational view of still another embodiment of this invention.
Figure 7:
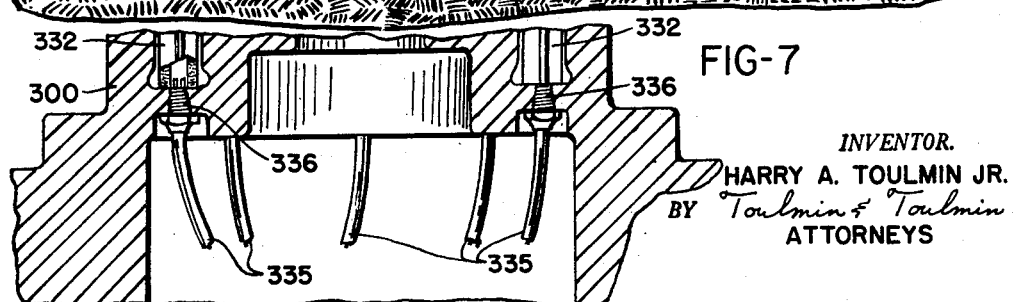
Figure 7 is a sectional view taken along line 7—7 of Figure 6.

Referring now to Figure 6, still another embodiment of the present invention will be seen. As before, this press includes a tube member 300 having a platen 302 rigidly secured at the base thereof. The tube 300 is slidably supported in the annular band 304 which is supported by the thrust members 306 around the periphery of the concrete pit 308. The outer edges of the platen 302 carry depending piston rods 310 which have piston heads 312 slidably movable in the cylinders 314. A press bed 316 is supported by piston rods 318 which carry piston heads 320 slidable in the cylinders 322.

As will be more clearly seen in Figures 7 through 10, the propelling means for forcing the platen downwardly in the embodiment consists of a plurality of individual rocket units, at 324. The tube 300 is provided with the relatively thick wall section 326 within which are located at peripherally spaced positions, a plurality of lined cylindrical openings 328. A propellant charge retainer 330 is provided for lining the hollow cylindrical opening 328. Within the retainer is provided the solid propellant charge itself, indicated in Figures 7 and 9 at 332, but shown in another embodiment at 334 (Figure 10). As will be seen in Figure 7, spark plugs at 336 are inserted in openings into the hollow interior of each of the solid propellant charges 332. Cables 335 lead to a source of power whereby the spark plugs may be fired at the proper time.

Referring now to Figures 8 and 9 in particular, it will be noted that a cover member 338 is provided on top of the tube 300. This cover is provided with a plurality of openings 340 through which the solid charges are introduced and the nozzle openings 334 which can be aligned with openings 328 by turning cover 338. Cover 338 is secured to the tube 300 by means of a split ring assembly 342 by the means of bolts or the like, as shown. Split ring 342 rests in an annular groove 345 in tube 300 and is adapted to rotate slidably therein. Thus, it will be understood that cover member 338 is rotatably mounted on the tube 300. In Figure 6 it will be seen that an arm 339 on cover 338 is arranged to be acted on by hydraulic pistons 341 so the cover can be turned between its two positions.

The operation of this embodiment of the invention is as follows:

Preparatory to firing of the press, the openings 328 are loaded with propellant charges at 332 as shown in Figure 8. It will be noted that the charges are symmetrically arranged around the tube 300 so that unnecessary vibration will be eliminated and balanced firing will occur. Leads 335 from the upper spark plugs are connected to that firing of the charges in the four openings, as shown, will occur simultaneously. Upon firing, the platen will be pressed as before, and there will be an exchange of fluid in the cylinders 314 and 322 to give the proper cushioning and retracting effect as described in the previous embodiments. It will be noted that the press in Figure 6 is single acting, and, therefore, the fluid acting upon piston head 320 is for the purpose of cushioning and not for positively moving the bed 316 upwardly.

Upon the completion of the downward stroke of platen 302, fluid from the accumulator tank 350 urges the pistons 312 upwardly to place the press in its initial starting position. At this time the solid propellant charges 332 have been completely burnt, and, therefore, the retainer tubes 328 must be reloaded. The construction of cover 338 and the fact that it is rotatable permits reloading of the retainer chambers 328 previously fired merely by turning the cover to align charging openings 340 with the tubes 328. After reloading has occurred, the cover 338 is again rotated so that the jet openings 344 are now in alignment with the loaded chambers.

It will therefore be understood that the press disclosed in Figures 6 through 10 is operated on a solid propellant rather than a liquid propellant as in the previous embodiments. Although the particular arrangement of firing the solid propellant charges 332 is shown to be for symmetrically placed charges, it will be understood that other arrangements could be employed.

Various types or shapes of solid propellant charges may be used, but several are preferable. As described in the embodiment of Figure 9, a cruciform or a cross-section that has a thick arm cross has been employed. However, another shape which is quite effective is that shown in Figure 10 and comprises a tubular member having three longitudinal and peripheral spaced ribs. The web 360 of a powder grain or charge at 334 has the minimum cross-sectional thickness between the two boundary surfaces of the grain; the web thickness controls the time required to burn the charge or grain. The rate at which gases are released by burning of the propellant depends on the amount of exposed surface of the grain. To minimize the strength, thickness, and weight required in the motor wall at 330, 326 to hold the pressure of the gases, it is desirable that the pressure during burning remains uniform without dangerous high pressure leaks. This requires that the grain burns without changing its total exposed area, where all the burning occurs.

Thus, the most effective way to achieve a constant area is to give the grain or charge the form of a tube. With such a shape, the exposed surface remains substantially constant, since, as the burning progresses, the exterior surface area of the tube decreases and the interior area increases. For these reasons, it is preferred to use the three ridge tubular form shown in Figures 9 and 10.

The composition of a powder grain or charge as described above is usually a plastic material, composed of nitrocellulose and nitroglycerin, plus other ingredients to promote good burning.

From the foregoing description, it will be readily understood that what has been provided is a rocket type of heavy press. In some of the embodiments, an elongated tubular member is made to reciprocate vertically due to the action of expanding and burning gases. In another of the embodiments, pistons are made to move through an elongated tube, also by the action of expanding gases. In still a further modification, a tubular member is made to reciprocate by the firing of a number of solid rocket propellant charges. It is believed that the use of rocket power in a press such as that disclosed offers many advantages over the known types, such as the presses operated by hydraulic systems. The simplicity offered by such a rocket press would enable the reduction of overall weight of the press by approximately 50%. And, for the same reasons, since no heavy hydraulic cylinders and fluid need be supported by the entablature, it is clear that a press such as disclosed herein could be contained within much smaller spaced limitations than with the usual type of hydraulic press.

Figure 11:
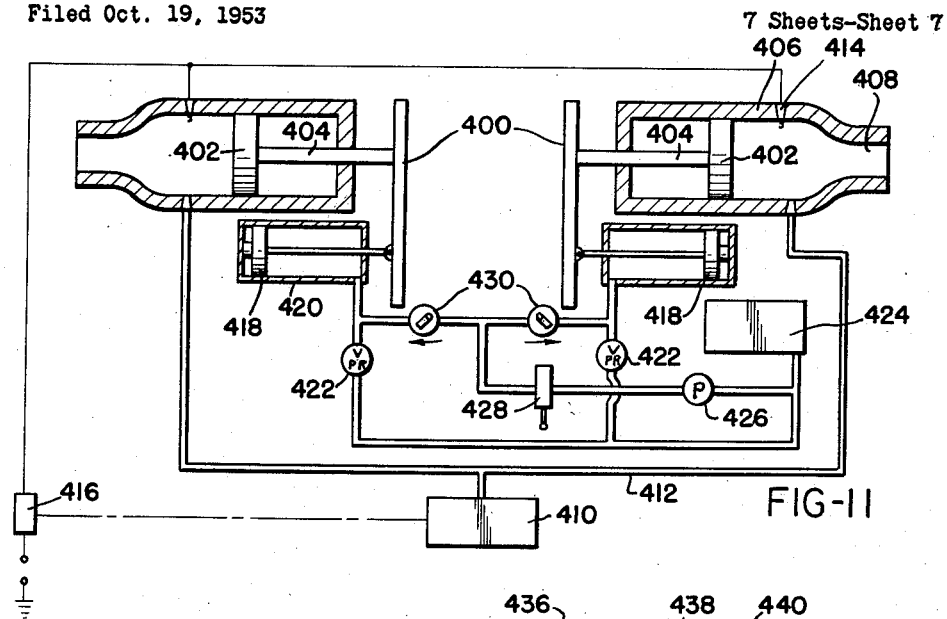
Figures 11, 12 and 13 show horizontally arranged presses constructed according to my invention.

In Figure 11, I show a horizontally arranged press having pressing members 400, each of which is connected with a piston head 402 by a ram 404. The piston heads 402 are movable in the cylinders 406, the outer ends of which comprise nozzle means 408.

Fuel supply means 410 is connected by conduit means 412 for supplying fuel to the combustion chambers in cylinders 406 between the piston heads 402 and the nozzle means 408. Igniter means 414 in the cylinders are provided and are under the control of a control device 416 which synchronizes the delivery of fuel to the combustion chambers with the operation of the igniters.

Each pressing member 400 also has connected therewith a piston 418 in a cylinder 420, so arranged that when the pressing members 400 are moved toward each other, fluid will be displaced from the cylinders 420 through the relief valves 422 to a tank 424 in order to cushion the movement of the said pressing members. A pump 426 is connected to draw fluid from tank 424 and to discharge it through a manual control valve 428 and check valves 430 to cylinders 420 for retracting the pressing members at the end of a working stroke thereof.

The Figure 11 arrangement provides for simultaneous actuation of spaced pressing members, preferably horizontally movable pressing members, and the press arrangement is particularly adapted for heavy forging operations where there is considerable flow of the metal, one of the principal advantages of the arrangement being that the flow of the metal is divided between the two sides thereof, so that the tendency for the grain lines to rupture is minimized.

Figure 12:
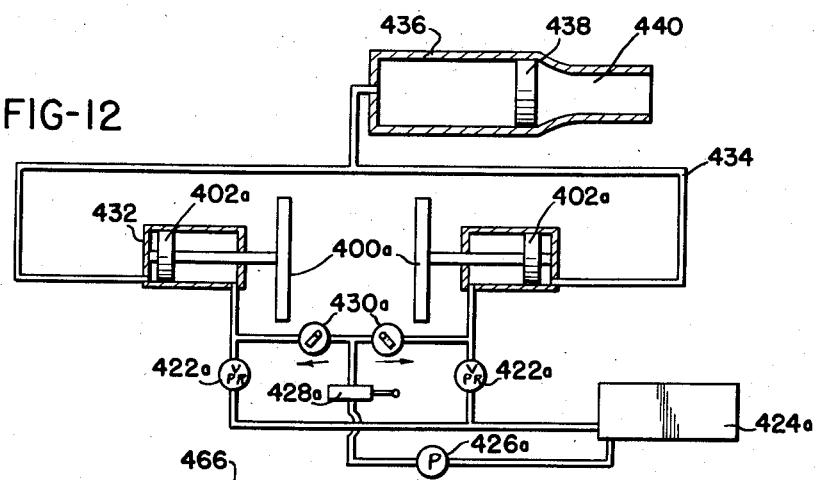

In Figure 12, there is illustrated an arrangement substantially identical with that of Figure 11, and bearing corresponding numerals, with the addition of a subscript "a" where the addition is appropriate. In Figure 12 the piston heads $402_a$, instead of being mounted in combustion chambers, are mounted in cylinders 432 which are interconnected by a conduit 434 leading to a cylinder 436 which is filled with fluid and which has a piston head 438 on the side of which opposite the fluid there is a combustion chamber 440. The Figure 12 arrangement provides for the simultaneous actuation of the two pressing members $400_a$ by the operation of a single combustion operated pressure generator.

The Figure 12 arrangement has the advantage that the combustion device can be located relatively remotely from the press.

Figure 13:
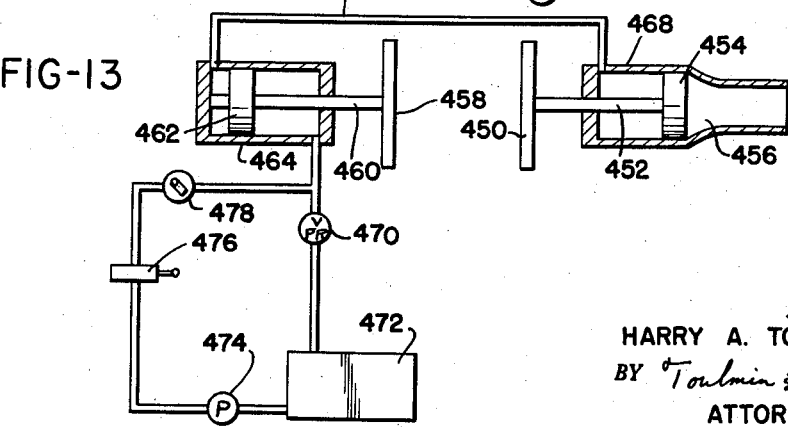

In Figure 13 I show still another horizontal press arrangement wherein a first pressing member 450 is connected by ram 452 with a piston head 454 exposed on the side opposite pressing member 450 to a chamber 456. A second pressing member 458 is connected by a ram 460 with a double acting piston 462 mounted in a cylinder 464. The left end of cylinder 464 is connected by a conduit 466 with the cylinder 468 in which piston 454 is movable, so that when piston 454 is driven leftwardly by pressure generated within combustion chamber 456, fluid displaced by the piston head from cylinder 468 will act on piston 462 to drive pressing member 458 toward pressing member 450.

The right end of cylinder 464 is connected through relief valve 470 with tank 472, while a pump 474 is connected to draw fluid from the tank and to discharge it through a control valve 476 and relief valve 478 to the right end of cylinder 464 for retracting the pressing members after a working stroke thereof.

It will be understood that this invention is susceptible to modification in order to adapt it to different usages and conditions, and, accordingly, it is desired to comprehend such modifications within this invention as may fall within the scope of the appended claims.

I claim:

1. A rocket press comprising a bed, an elongated tube reciprocably mounted for movement toward and away from said bed and having the end remote from said bed open to the atmosphere, a platen on the other end of said elongated tube for registration with said bed, a combustion chamber in said tube and open to the atmosphere through the open end of said tube, and a combustible rocket propellant ignited in said chamber so that the gases discharged from said chamber to the atmosphere produce a reaction within said elongated tube to move said tube and platen toward said bed.

2. A rocket press comprising a bed, a frame, an elongated tube slidably mounted in said frame for reciprocating movement toward and away from said bed, said elongated tube having the end remote from said bed open to the atmosphere, means for limiting the reciprocating movement of said tube, a platen on the other end of said elongated tube for registration with said bed, a combustion chamber in said tube and open to the atmosphere through the open end of said tube, and a combustible rocket propellant ignited in said chamber so that the gases discharged from said chamber to the atmosphere produce a reaction within said elongated tube to move said tube and platen toward said bed.

3. A rocket press comprising a bed, an elongated tube reciprocably mounted for movement toward and away from said bed and having the end remote from said bed open to the atmosphere, a platen on the other end of said elongated tube for registration with said bed, and reaction propulsion means solely within said elongated tube for moving said tube and platen toward said bed.

4. A rocket press comprising a bed, an elongated tube reciprocably mounted for movement toward and away from said bed and having the end remote from said bed open to the atmosphere, a platen on the other end of said elongated tube for registration with said bed, a combustion chamber in said tube and open to the atmosphere through the open end of said tube, a combustible rocket propellant in said chamber, and means on said elongated tube for igniting said combustible rocket propellant so that the gases discharged from said combustion chamber to the atmosphere produce a reaction within said elongated tube to move said tube and platen toward said bed.

5. A rocket press as claimed in claim 1 with said elongated tube being reciprocably mounted in a vertical position.

6. A rocket press comprising a bed, an elongated tube reciprocably mounted for movement toward and away from said bed and having the end remote from said bed open to the atmosphere, a platen on the other end of said elongated tube for registration with said bed, a plurality of combustion chambers peripherally disposed in the open end of said tube, a solid rocket propellant charge in some of said chambers, and means for igniting said rocket propellant charges in said chambers so that the gases discharged from said chambers to the atmosphere produce a reaction within said elongated tube to move said tube and platen toward said bed.

7. A rocket press comprising a bed, an elongated tube reciprocably mounted for movement toward and away from said bed and having the end remote from said bed open to the atmosphere, a platen on the other end of said elongated tube for registration with said bed, a plurality of peripherally disposed rocket chambers in the upper end of said tube, said chambers having a lining therein, means for fixedly retaining a solid propellant charge within the lining of some of said chambers, said means comprising a rotatable cover member having a plurality of openings peripherally disposed therein and corresponding in number to said rocket chambers, a plurality of ejection nozzles symmetrically disposed in some of the openings in said cover, and means for igniting said charges so as to produce a downward thrust in said tube to move said tube and platen toward said bed.

8. A rocket press comprising a bed, an elongated tube reciprocably mounted for movement toward and away from said bed and having the end remove from said bed open to the atmosphere, a platen on the other end of said elongated tube for registration with said bed, a combustion chamber in said tube and open to the atmosphere through the open end of said tube, a combustible rocket propellant ignited in said chamber so that the gases discharged from said chamber to the atmosphere produce a reaction within said elongated tube to move said tube and platen toward said bed, and means associated with said bed for enabling said bed to resist the impact of the platen thereon.

9. A rocket press comprising a bed, an elongated tube reciprocably mounted for movement toward and away from said bed and having the end remote from said bed open to the atmosphere, a platen on the other end of said elongated tube for registration with said bed, a combustion chamber in said tube and open to the atmosphere through the open end of said tube, and means for injecting a combustible rocket propellant into said combustion chamber, said propellant being ignited in said chamber so that the gases discharged from said chamber to the atmosphere produce a reaction within said elongated tube to move said tube and platen towards said bed.

(References on following page)

References Cited in the file of this patent

UNITED STATES PATENTS

| | | |
|---|---|---|
| 1,054,194 | Gerdau | Feb. 25, 1913 |
| 1,063,632 | White et al. | June 3, 1913 |
| 2,300,162 | Maude | Oct. 27, 1942 |
| 2,384,161 | Ernst | Sept. 4, 1945 |
| 2,417,794 | Werner | Mar. 18, 1947 |
| 2,510,572 | Goodard | June 6, 1950 |
| 2,633,094 | Muller | Mar. 31, 1953 |
| 2,659,197 | Halford et al. | Nov. 17, 1953 |

OTHER REFERENCES

Popular Mechanics, September 1948, pages 102–107.